Figure 1:
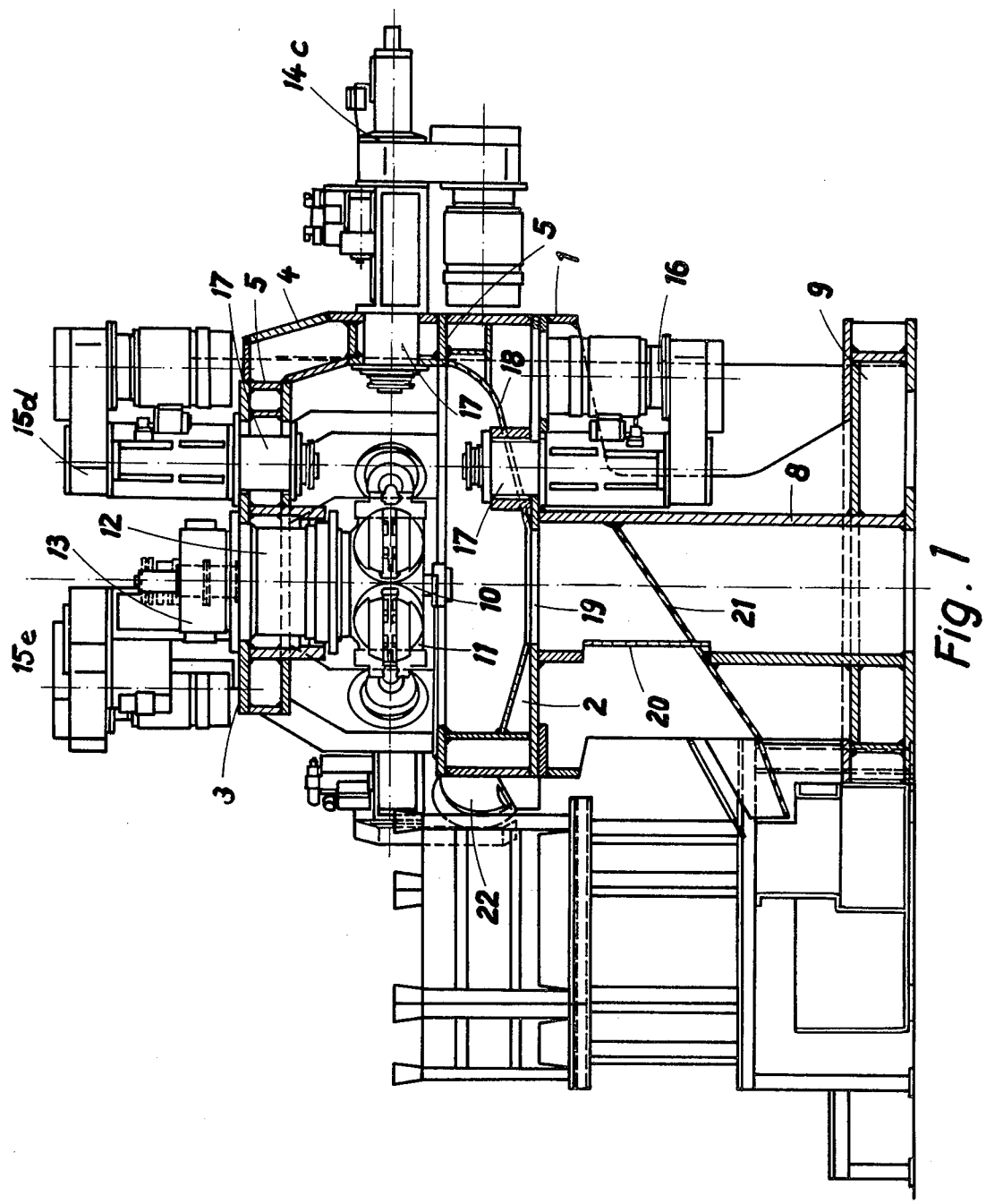

United States Patent [19]

Bezner et al.

[11] Patent Number: 4,473,930
[45] Date of Patent: Oct. 2, 1984

[54] AUTOMATIC TRANSFER MACHINE TOOL WITH CIRCULAR SUPPLY MOVEMENT

[75] Inventors: Heinz Bezner, Schwieberdingen; Manfred Bratz, Leonberg; Sven Frank, Freiberg; Wolfgang Grau, Böblingen-Dagersheim; Hans-Jorg Semsky, Stuttgart; Heinz Walter, Renningen-Malmsheim; Armin Witzig, Renningen; Rudolf Blochmann, Leonberg, all of Fed. Rep. of Germany

[73] Assignee: Witzig & Frank Maschinenbaugesellschaft mbH, Leonberg, Fed. Rep. of Germany

[21] Appl. No.: 374,915

[22] Filed: May 4, 1982

Related U.S. Application Data

[63] Continuation of Ser. No. 139,121, Aug. 13, 1979, abandoned.

[30] Foreign Application Priority Data

Dec. 14, 1977 [DE] Fed. Rep. of Germany ....... 2755755

[51] Int. Cl.³ .............................................. B23Q 39/04
[52] U.S. Cl. ..................................... 29/38 C; 408/45; 409/235
[58] Field of Search .................... 29/38 A, 38 B, 38 C, 29/563; 408/45, 71; 409/235; 82/2 D

[56] References Cited

U.S. PATENT DOCUMENTS 2,789,480  4/1957  Wellauer ............................. 409/235

FOREIGN PATENT DOCUMENTS 2508571  9/1976  Fed. Rep. of Germany .

OTHER PUBLICATIONS

V. Boetz. Werkstatt und Betrieb 106 May, 1973 pp. 319.

Primary Examiner—Z. R. Bilinsky
Attorney, Agent, or Firm—Frishauf, Holtz, Goodman & Woodward

[57] ABSTRACT

In an automatic transfer machine tool with circular supply movement for workpieces to be sequentially worked on in respectively separate working stations (I–V), a stepwise indexable workpiece holder (10) is journalled on a center post (8), the workpiece holder (10) having clamping devices (11) arranged thereon for the workpieces. In order to be able to accept high working forces at the working stations (I–V) without danger of impairment of working accuracy, and to obtain good accessibility of the workpieces and of the tools of the machining units (14, 15, 16), the automatic transfer machine tool has a rigid cage (1) with two wall portions (2, 3) which are located opposite from each other and spaced from each other and rigidly interconnected, the upper wall portion (3) having the workpiece holder (10) rotatably journalled on the upper wall portion (3) within the interior of the cage, and the cage is seated with the lower wall portion (3) on the center post (8), the machining units (14, 15, 16) being inserted in the region of the respective separate working stations (I–V) in the cage (1).

5 Claims, 2 Drawing Figures

AUTOMATIC TRANSFER MACHINE TOOL WITH CIRCULAR SUPPLY MOVEMENT

This is a continuation, of application Ser. No. 139,121 filed Aug. 13, 1979 now abandoned.

This invention relates to an automatic transfer machine tool with circular supply movement for workpieces which are to be worked on in respective work stations, sequentially, by machine tool units, with a workpiece carrier which can be indexed by an indexing movement, in steps, and which is coaxially, rotatably journalled with respect to a center post, which workpiece carrier has arranged thereon clamping devices for the workpiece and which can be fixedly locked in respective angular positions corresponding to the various stations.

BACKGROUND

In an automatic transfer machine tool of this type which is known from German Patent Disclosure Document DE-OS 25 08 571, the arrangement is so made that a ring-shaped workpiece carrier is rotatably journalled on a center post between two coaxial carriers, rigidly connected with the center post, in which the center post forms the supporting machine stand. The coaxial carriers are, in general, disk-shaped and the machining units are supported in the region of the various respective working stations. The two carriers may be connected in the region of the various respective working stations by stiff holders, in which the tool working units are seated. The forces which arise upon operation in the direction of the tool holding sleeves of the working tool units are limited, since the two disk-shaped carriers are independently journalled at a distance from each other on the center post and project freely therefrom. The forces which the carriers can accept without being subjected to an unacceptable elastic deformation which decreases the working accuracy are limited. Access of the ring-shaped workpiece carrier which is journalled on a center post is limited particularly due to the center post. Further, chip removal must occur laterally next to the center post.

THE INVENTION

It is an object of the invention to improve such an automatic transfer machine tool such that high work forces can be accepted on the work stations without danger of limiting the operating accuracy, and which provides in excellent access of the workpieces and of the tools of the machining units, and results in a simple construction.

Briefly, in accordance with the invention, the machine tool it has a rigid closed moncoque cage with two opposite wall portions which are rigidly interconnected by circularly placed lateral construction elements, in which the workpiece carrier is journalled on the upper wall portion, positioned in the interior of the cage. The cage is seated with its lower wall portion on the center post. The machining units are inserted in the region of the various respective working stations in the cage.

The cage forms a closed force accepting system, closed in itself, so that reaction forces which arise upon machining are accepted thereby in itself. No forces have to be accepted by the machine stand, the center post, or the like. This results in excellent stiffness with the result that material removal, impact, and pressure machining can be carried out with highest accuracy, and it is generally possible to carry out machining operations in which very high working forces occur.

The center post does not have a force accepting function in this machine; it serves only to hold the cage in place at a suitable working height. Basically it would be possible to suspend the cage 15 instead, on a suitable structure.

The cage, in a preferred embodiment, can be formed in double-shell construction, in which the two shells are connected together by stiffening transverse ribs. The suspension of the workpiece carrier in the interior of the cage at the upper wall portion thereof results in a free, unimpeded flow of chips downwardly, in which the hollow center post can be formed as a chip removal tube, and terminates in a suitable opening of the shell-like lower wall portion of the cage. Suitably, the center post is formed with a lateral chip removal opening which joins a chip removal slide positioned in the interior of the center post.

The cage, preferably, is constructed as a welded structure, which may, in a horizontal plane, have an essentially circular cross-sectional shape, and is formed in the region of an operating station with a segment-like cut-out, which permits easy and simple servicing of the workpiece carrier.

It is desirable that the work machining units are inserted in suitable bearing portions of the cage from the outside when the workpiece units are positioned outside of the cage, the workpiece units being located in the upper and/or lower wall portion, as well as on the lateral structural elements of the cage. The machining units thus are positioned outside of the space where chips occur; only the tool holder sleeves project into the interior of the cage. Interference with the tool units, their feed apparatus, gearing, and the like, by lubricants, cooling means, chips, and the like, is thereby made impossible, permitting however servicing of the tool units themselves from the outside and supply thereof with electrical current, compressed air, and the like, from the outside.

The workpiece carrier, preferably, is seated on an indexing drum which is positioned in the upper wall portion of the cage to be removable upwardly, so that the workpiece carrier can be easily disassembled for servicing or maintenance work. Finally, in order to permit easy adjustment, in exchange of the tools of the various respective machining units, it is suitable that the cage be formed with servicing openings in the region of the various respective working stations which permit maintenance of the tools of the working or machining units. An example of the subject matter of the invention is shown in the drawing. There is shown in FIG. 1 an automatic transfer machine tool in accordance with the invention in an axial section, in side view; and in FIG. 2 the automatic transfer machine tool according to FIG. 1 in a top view.

The automatic transfer machine tool has a closed cage 1 similar to a housing which is provided with a disk-shaped lower wall portion 2 and, located at a distance therefrom, a likewise essentially disk-shaped upper wall portion 3, the two wall portions 2, 3 being connected by circularly located structural elements in the form of stiff struts 4 welded thereto. The two wall portions 2, 3, spaced from each other, and the struts 4 are constructed in double-wall or shell form. The two walls are connected by stiffening ribs. Some of them are visible, for example, at 5 in FIG. 1.

The cage 1, in top view, has an essentially circular cross-sectional shape. The cage 1 has a segment-like cut-out 7 limited by a secant 6 at the left side in FIGS. 1 and 2, in order to permit easy access to the interior of the cage. The cage, further, is made in welded construction. It is seated on a hollow center post 8 which, in turn, is connected to a base 9.

Figure 2:
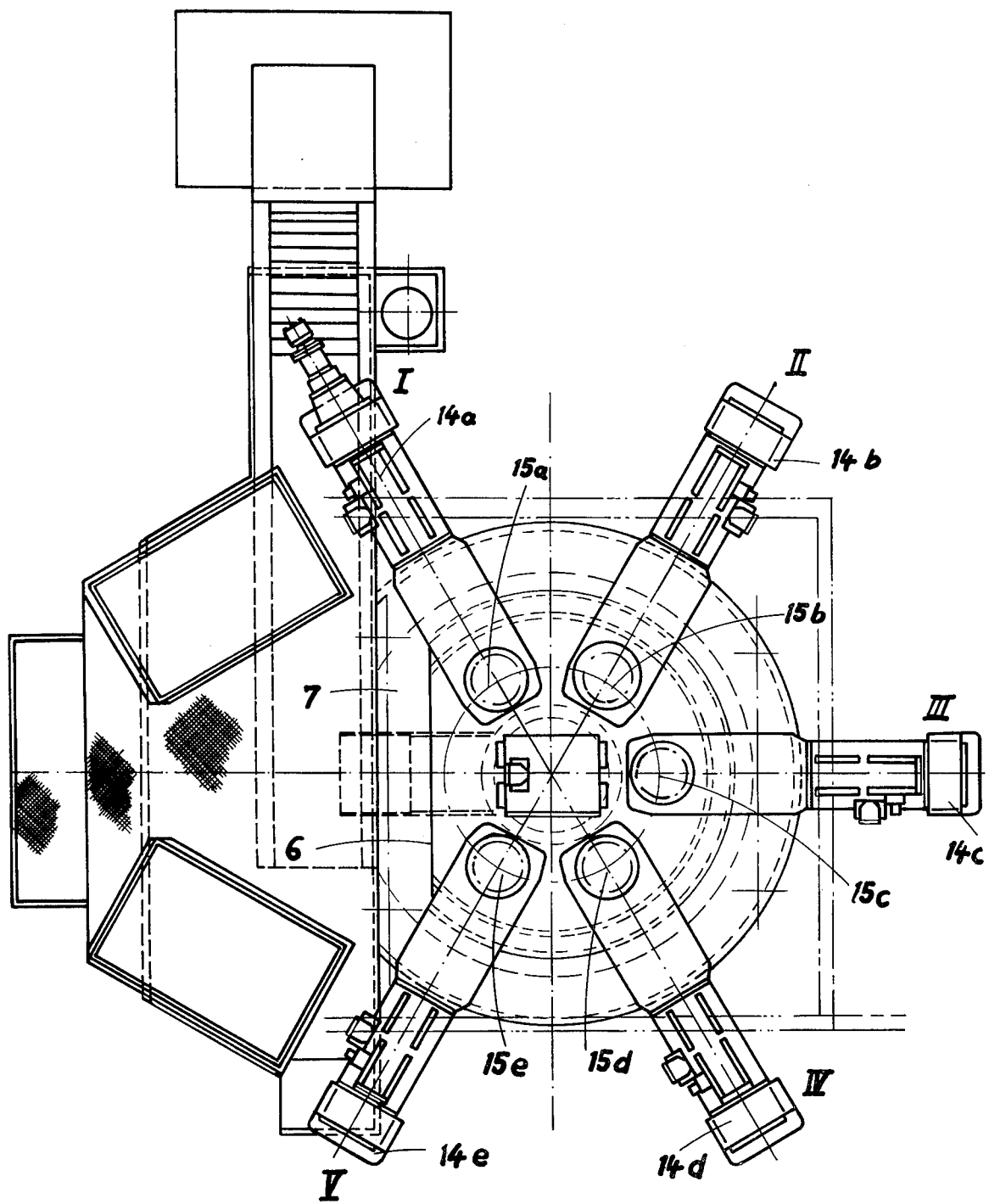

A drum-shaped workpiece carrier 10, rotatable about a vertical axis, is positioned in the interior of the cage 1. The drum-shaped workpiece carrier at its circumference workpiece clamping arrangements indicated at 11, and is connected to a coaxial cylindrical indexing drum or turret 12 which, in turn, is rotatably journalled in the upper wall portion 3 of the cage 1 in such a manner that the workpiece carrier 10 is freely suspended within the interior of the cage 1. The indexing drum or turret 12 is coupled with an indexing drive indicated at 13, to index the workpiece carrier 10 in steps in such a manner that workpieces clamped in the workpiece clamping devices 11 are sequentially carried to the respective work stations, of which five are indicated in FIG. 2 at from I to V. The workpiece carrier 10 can be locked in fixed position in the angular position corresponding to the respective working stations I to V by devices not further shown.

The arrangement is so made that, after removal of the workpiece carrier 10 from the indexing drum 12, the indexing drum 12 may be pulled out from the cage so that assembly and disassembly is simple.

Machining units are provided in the various respective work stations I to V of which, for example, the machining units 14a–14e are inserted in the lateral struts 4 of the cage 1. The machining units and their tool holder sleeves, not further shown, are in a horizontal plane, or have a predetermined angular position with respect to a horizontal plane. Machining units 15a–15e are fitted in the upper wall portion 3 of the cage 1 to work on the workpieces from the top. Further, machining units 16 are inserted in the lower wall portion 2 so that they can work on the workpieces from the bottom, as can be seen in FIG. 1.

All machining units 14, 15, 16 are inserted from the outside by means of associated holding portions 17 in corresponding bearing portions of the cage 1, so that the machining units, that is, their feed devices, their drive motors, their electrical current supply devices, their gears, etc., are outside of the cage 1 and only the tool holding sleeves extend into the interior of the cage. The machining units 14, 15, 16 thus can be serviced from the outside, and, if necessary, exchanged.

Service openings 23 are located in the region of the work stations I to V in the cage 1 between the struts 4, which permit setting of the tools of the respective various machining units 14, 15, 16 and, if necessary, to exchange them.

The lower wall portion 2 of the cage 1 is, at the inside, formed in shell shape as seen at 18, which ends over an opening 19 in the hollow center post 8, and which is formed as a chip removal tube. The center post 8 is formed with a lateral chip removal opening 20 which fits against an inclined chip slide 21 located in the interior of the post 8, which extends towards the outside and which can lead to a chip conveyor.

Chips which arise upon machining drop freely from the workpieces clamped in the workpiece clamping devices 11 of the workpiece holder 10, and unimpeded downwardly, from where they can be carried out easily through the central chip removal tube formed by the center post 8.

Operating devices are located in the range of the operating station 7; they are indicated for example at 22.

Since the cage 1 forms a closed structural element like a housing, the reaction forces which are transferred over the tool holder sleeves of the machining units 14, 15, 16 are accepted by the cage itself, without acting on the center post 8 or on other support elements. The wall portions 2, 3, held spaced from each other by the struts 4, form a cage construction in the form of a press stand, so that it can accept very high forces without danger of torsional twist or deformation.

We claim:

1. Automatic machine tool with rotary supply movement for workpieces to be worked on, sequentially, having a plurality of holding elements (17) and a plurality of machining units (14, 15, 16) removably positioned and supported by the holding elements (17), the plurality of machining units being located at respective separate working stations (I–V);

a rotatable turret (12) indexable with respect to the working stations and coaxially rotatably journalled with respect to the center support;

a workpiece carrier (10) secured to the turret;

workpiece clamping devices (11) for clamping the workpieces located on the carrier for placement in fixed position at angular locations corresponding to the respective working stations;

a center support (8) adapted for positioning on a base (9);

and means for supporting said turret, adn hence the workpiece, and the holding elements, and hence the machining units, comprising a rigid, closed monocoque cage (1) accepting, within the structure of said cage, operating forces occurring in operation of the machining units by transfer to the cage, said cage including a lower, essentially horizontal disk-like dished wall (18);

an upper, essentially horizontal disk-like wall (3) located parallel to and spaced upwardly from the lower disk-like wall;

circumferentially positioned lateral structural wall elements (4) rigidly interconnecting said upper and said lower disk-like walls to form said cage as a rigid, closed-loop, monocoque, unitary shell structure, the cage including essentially parallel positioned, spaced double-wall elements and stiffening cross ribs (5) connecting together said spaced wall elements to form said cage and provide for stress absorption and stress transfer into said closed-loop monocoque unitary shell structure;

the turret (12) and hence the workpiece carrier (10) and the workpieces thereon being solely supported by the upper disk-like wall (3) centrally thereof and suspending the workpiece carrier, and the workpieces thereon, from the turret and hence the upper wall of the cage, to thereby place the workpieces within said cage;

the disk-like lower wall (18) of the cage being supported on the center support (8) by engagement of said center support therewith, said center support terminating beneath the lower wall (18) of the cage; and a central opening (19) for chip removal being formed in the lower wall;

wherein the holding elements (17) are secured to at least one side of said walls (2, 3) and in a facing side of said walls formed by said lateral structural wall elements (4) interconnecting said disk-like walls (18; 3) for effectively transferring forces from said holding elements, and hence machining operating forces occuring in operation of the machining units, to said unitary monocoque rigid cage structure, and wherein the machining units are secured to the cage (1) via said holding elements in the region of the separate working stations (I–V) and projecting in part within the cage for machining of workpieces supported within the cage and further partly projecting outwardly of the cage, for access thereto.

2. Machine tool according to claim 1, wherein the center support comprises a hollow center post (8), the post terminating at its upper end at the central opening (19) formed in the lower wall (2) of the cage to form, simultaneously, a support post and a chip removal tube, for chip removal by gravity.

3. Machine tool according to claim 2, wherein the center post (8) is formed with a lateral chip removal opening (20);

and a chip slide (21) is located in the interior of the hollow center post and joined to the chip removal opening (20).

4. Machine according to claim 1, wherein the circumferentially positioned structural elements (4) are located around the circumference to leave free a segmental zone at the circumference of the cage (1) for access to the interior thereof.

5. Machine according to claim 1, wherein the cage (1) is formed with operating openings (23) in the region of the respective separate working stations (I–V) to permit servicing of tools of the machining units (14, 15, 16).

* * * * *